US010862698B2

(12) United States Patent
Bae et al.

(10) Patent No.: US 10,862,698 B2
(45) Date of Patent: Dec. 8, 2020

(54) METHOD AND DEVICE FOR SEARCHING FOR AND CONTROLLING CONTROLLEES IN SMART HOME SYSTEM (71) Applicant: Samsung Electronics Co., Ltd., Gyeonggi-do (KR)

(72) Inventors: Eunhui Bae, Gyeonggi-do (KR); Dongkeon Kong, Gyeonggi-do (KR); Sehoon Kim, Seoul (KR); Junhyung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 793 days.

(21) Appl. No.: 15/105,803

(22) PCT Filed: Dec. 19, 2014

(86) PCT No.: PCT/KR2014/012604
§ 371 (c)(1),
(2) Date: Jun. 17, 2016

(87) PCT Pub. No.: WO2015/093902
PCT Pub. Date: Jun. 25, 2015

(65) Prior Publication Data
US 2018/0205568 A1    Jul. 19, 2018

(30) Foreign Application Priority Data
Dec. 20, 2013  (KR) .................. 10-2013-0160128

(51) Int. Cl.
*H04L 12/28* (2006.01)
*H04W 48/16* (2009.01)

(52) U.S. Cl.
CPC ...... *H04L 12/2816* (2013.01); *H04L 12/2809* (2013.01); *H04L 12/2832* (2013.01); *H04L 12/2834* (2013.01); *H04W 48/16* (2013.01)

(58) Field of Classification Search
CPC ......... H04L 41/12; H04L 45/02; H04L 45/00; H04L 45/04; H04W 84/18
(Continued)

(56) References Cited
U.S. PATENT DOCUMENTS 5,933,849 A * 8/1999 Srbljic ................ G06F 12/0813
711/118
6,298,451 B1 * 10/2001 Lin ........................ G06F 9/5055
714/2
(Continued)

FOREIGN PATENT DOCUMENTS

CN          1276942       12/2000
JP          2004252974    9/2004
(Continued)

OTHER PUBLICATIONS

PCT/ISA/210 Search Report issued on PCT/KR2014/012604 (pp. 3).
(Continued)

*Primary Examiner* — Peter G Solinsky
*Assistant Examiner* — Sanjay K Dewan
(74) *Attorney, Agent, or Firm* — The Farrell Law Firm, P.C.

(57) ABSTRACT

The present invention relates to a method and a device for searching for and controlling controllees in a smart home system. The method for searching for and controlling controllees existing on two or more networks from controllers in a smart home system, according to one embodiment of the present invention, comprises the steps of: requesting a list of the controllees and receiving the list of the controllees from a server; transmitting a response request signal for requesting a response to the controllees existing in the received list of the controllees; and, when a response signal has not been received from one or more controllees, generating a non-
(Continued)

response list for controlling, by the server, the controllees from which the response signal has not been received.

18 Claims, 6 Drawing Sheets

(58) Field of Classification Search
USPC .......................................................... 370/254
See application file for complete search history.

(56) References Cited

U.S. PATENT DOCUMENTS

| | | | |
|---|---|---|---|
| 6,578,079 B1 | 6/2003 | Gittins | |
| 6,745,242 B1* | 6/2004 | Schick | H04L 41/5003 709/224 |
| 7,237,029 B2* | 6/2007 | Hino | H04L 12/2803 709/224 |
| 7,581,006 B1* | 8/2009 | Lara | H04L 67/1008 709/217 |
| 9,525,725 B1* | 12/2016 | Bute | H01L 21/28088 |
| 2003/0196148 A1* | 10/2003 | Harrisville-Wolff | H04L 43/00 714/47.1 |
| 2004/0205172 A1* | 10/2004 | Kim | H04L 12/2803 709/222 |
| 2006/0282516 A1 | 12/2006 | Taylor et al. | |
| 2007/0192464 A1* | 8/2007 | Tullberg | H04L 61/2015 709/223 |
| 2013/0290551 A1* | 10/2013 | Yang | H04L 12/2803 709/228 |
| 2014/0080466 A1* | 3/2014 | Shih | H04L 12/2814 455/418 |
| 2015/0005900 A1* | 1/2015 | Steele | G05B 15/02 700/19 |
| 2015/0098357 A1* | 4/2015 | Lupien | H04W 48/20 370/254 |
| 2015/0312348 A1* | 10/2015 | Lustgarten | H04L 67/12 705/14.66 |
| 2015/0373753 A1* | 12/2015 | Turon | H04W 76/10 370/254 |
| 2016/0125303 A1* | 5/2016 | Yang | G06Q 10/06398 706/52 |
| 2016/0164694 A1* | 6/2016 | Hyun | H04L 12/12 348/14.08 |
| 2016/0219496 A1* | 7/2016 | Jang | H04L 12/2809 |
| 2016/0224043 A1* | 8/2016 | Liu | H04L 67/125 |
| 2016/0234734 A1* | 8/2016 | Chaudhuri | H04W 36/30 |
| 2016/0241660 A1* | 8/2016 | Nhu | H04L 67/26 |
| 2017/0060566 A1* | 3/2017 | Li | G06F 9/4411 |
| 2018/0260292 A1* | 9/2018 | Wang | H04L 43/10 |

FOREIGN PATENT DOCUMENTS

| | | | | |
|---|---|---|---|---|
| KR | 20130077734 | | 7/2013 | |
| KR | 20130077734 A | * | 7/2013 | ............ G06F 3/0484 |
| WO | WO 2012096505 | | 7/2012 | |

OTHER PUBLICATIONS

PCT/ISA/237 Written Opinion issued on PCT/KR2014/012604 (pp. 5).

Chinese Office Action dated Mar. 4, 2019 issued in counterpart application No. 201480069515.5, 23 pages.

* cited by examiner

METHOD AND DEVICE FOR SEARCHING FOR AND CONTROLLING CONTROLLEES IN SMART HOME SYSTEM

PRIORITY

This application is a National Phase Entry of PCT International Application No. PCT/KR2014/012604, which was filed on Dec. 19, 2014, and claims priority to Korean Patent Application No. 10-2013-0160128, which was filed on Dec. 20, 2013, the contents of each of which are incorporated herein by reference.

TECHNICAL FIELD

The present invention relates to a method and apparatus for discovering and controlling a controllee device in a smart home system.

BACKGROUND ART

With the rapid advance of technology, so-called smart home systems which are capable of controlling home electric appliances by means of an electronic device have emerged.

In a smart home system environment, it may be possible to control various types of electronic devices (such as lighting system, heating system, security system, air conditioner, refrigerator, and television) using a remote control device. Such a smart home system is composed of a plurality of controlled devices (controllees) as control objects, a controller for controlling the controllees, and a server.

The controllees may include the aforementioned lighting control system, heating control system, security system, air conditioner, refrigerator, television, and robot cleaner that can be control electronically. A certain controllee may have a control device such as a set-top box and a wireless electronic control device. The set-top box or wireless electronic control device may be combined with another device. For example, the set-top box may be included in an electronic appliance such as a smart television, and the wireless electronic control device may be implemented in a smartphone or a tablet computer.

The server may store the information on the controllees deployed in the smart home and provide the device information to the set-top box or wireless electronic control device. It may also provide the set-top box or wireless electronic control device with various data for use in controlling the controllees deployed in the smart home.

The smart home system is evolving from a wired control format to a wireless control format and from a control format for controlling controllees directly to a control format for controlling the controllees via an Access Point (AP) installed inside the home.

The wireless control-based and AP-based smart home system may encounter a problem as follows. For example, if there are two APs in the smart home, a controllee may communicate with the nearest AP or the AP having stronger signal strength.

At this time, if the AP to which the wireless electronic control device connects differs from the AP to which the controllee connects, the wireless electronic control device misjudges that the controllee has disappeared from the control area or there is no controllee to control. In such a case, if there are two or more APs in the smart home system, the user may encounter an unexpected situation and be incapable of controlling a target controllee.

DISCLOSURE OF INVENTION

Technical Problem

The present invention provides a method and apparatus for identifying a controllee especially when the controllee and a control device are connected to different APs.

Also, the present invention provides a method and apparatus for controlling the controllee especially when the controllee and the control device are connected to different APs.

Also, the present invention provides a method and apparatus for identifying a controllee especially when the controllee and a control device are connected to different networks.

Furthermore, the present invention provides a method and apparatus for controlling the controllee especially when the controllee and the control device are connected to different networks.

Solution to Problem

In accordance with an aspect of the present invention, a method for a control device to discover and control controllees located on two or more networks in a smart home system includes receiving a list of the controllees from a server by transmitting a request for the list of the controllees, transmitting a reply request signal to the controllees included in the list, and generating a non-replied controllee list for controlling the controllees from which no response signal is received via the server when no response signal is received from at least one of the controllees.

In accordance with an aspect of the present invention, a control device for discovering and controlling controllees located on two or more networks in a smart home system includes a communication interface for communicating data with the networks and data with a server; a memory for storing a list of the controllees and a non-replied controllee list; and a control unit which controls receiving the list of the controllees from a server and storing the list in the memory, transmitting a reply request signal to the controllees included in the list through the communication interface, and generating the non-replied controllee list for controlling the controllees from which no response signal is received via the server and storing the non-replied controllee list in the memory when no response signal is received from at least one of the controllees.

Advantageous Effects of Invention

The controllee identification and control method of the present invention is advantageous in terms of identifying and controlling a controllee especially when the controllee and a control device are connected to different APs. Also, the controllee identification and control method of the present invention is advantageous in terms of preventing an absence of control over a controllee in a smart home system having two or more APs.

MODE FOR THE INVENTION

Exemplary embodiments of the present invention are described with reference to the accompanying drawings in detail. Various changes may be made to the invention, and the invention may have various forms, such that exemplary embodiments will be illustrated in the drawings and described in detail. However, such an embodiment is not intended to limit the invention to the disclosed exemplary embodiment and it should be understood that the embodiment includes all changes, equivalents, and substitutes within the spirit and scope of the invention. Throughout the drawings, like reference numerals refer to like components.

Figure 1:
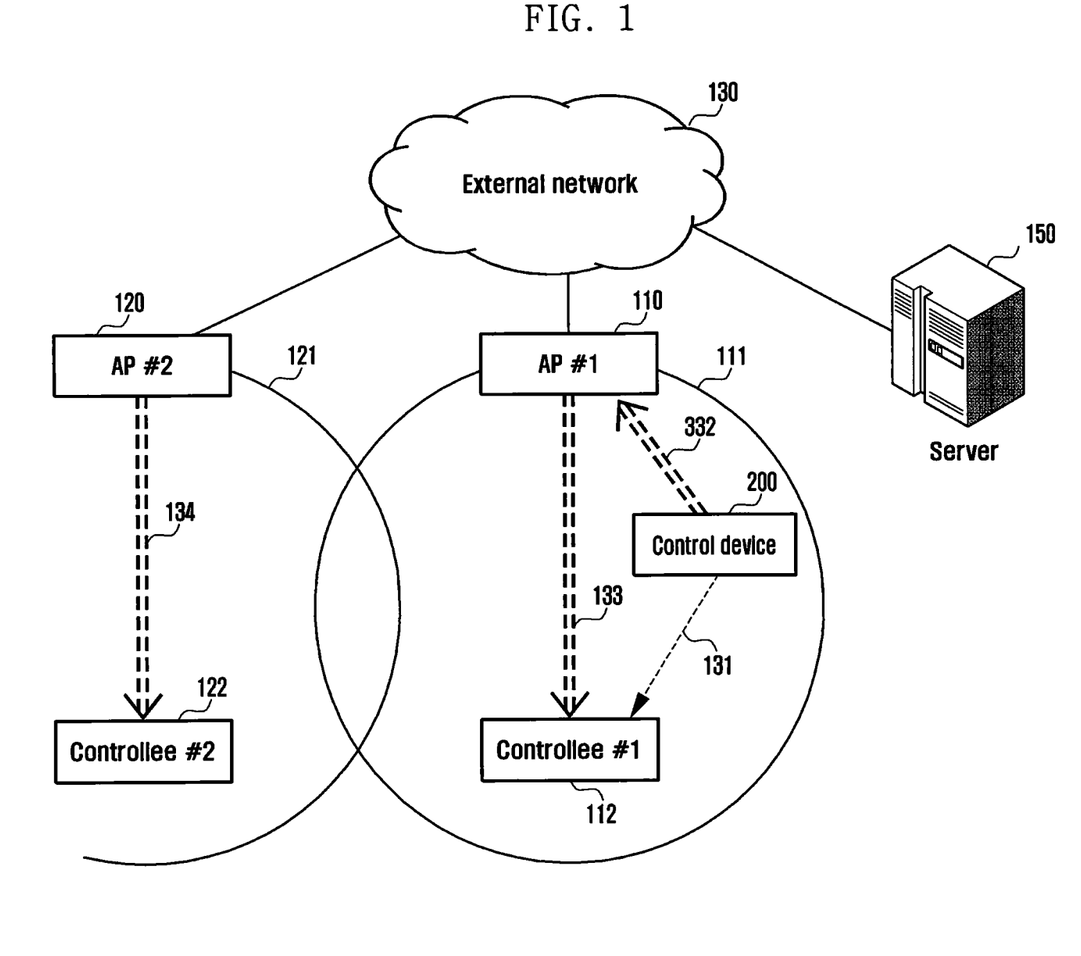
FIG. 1 is a schematic diagram illustrating a system for controlling controllees connected to a network different from the network to which a control device is connected according to the present invention.

FIG. 1 is a schematic diagram illustrating a system for controlling controllees connected to a network different from the network to which a control device is connected.

Referring to FIG. 1, two APs 110 and 120 form respective communication areas. Although two APs 110 and 120 are depicted in FIG. 1 for explanatory convenience, three or more APs may exist in the system.

The first AP (AP#1) 110 forms the first communication area 111 in which the control device 200 and the first controllee 112 are located. Also, the second AP (AP#2) 120 forms the second communication area 121 in which the second control device 122 is located. As described above, the first and second APs 110 and 120 may be deployed in one smart home system. For example, the first and second APs 110 and 120 may be the APs deployed respectively in the first and second floors of a two-story house in which the smart home system is installed or the APs deployed respectively in the left and right parts of a one-story house. Although two or more APs can be deployed in various manners, the present invention is directed to a smart home system implemented with two APs.

The APs may connect to the server 150 via the external network 130. The external network 130 may be a wired network such as the Internet or a mobile communication network.

The server 150 may manage a list of control devices and controllees per smart home and the information on the APs with which the controllees can communicate. According to an embodiment, if it is required to control a certain controllee, the control device 200 transmits a signal for controlling the target controllee to the AP to which the target controllee has connected or all APs registered with the smart home to which the control device 200 has connected. If a response signal is received from the target controllee in response to the control signal, the AP forwards the response signal to the controllee.

The control device 200 may have a program for controlling the electronic devices deployed in the house in which the smart home system is installed so as to control a certain controllee directly or via an AP to which it has connected. According to an embodiment of the present invention, the control device 200 may request to the server 150 for the control of a controllee when the controllee is not connected to the same AP or when the control device 200 cannot communicate with the controllee. Here, the control device 200 may be implemented in one of various forms such as a smartphone, a tablet computer, a smart television, and a smart refrigerator (detailed description thereof is made later with reference to FIGS. 2 and 3).

The controllees 112 and 122 may be electronic devices connected to another device such as a set-top box through wired or wireless links in the smart home system, and examples of electronic devices include a television, a laundry machine, a refrigerator, an air conditioner, a heating system, and a security system.

In FIG. 1, the control device 200 may transmit a signal to the controllee 112 directly as denoted by reference number 131 or via an AP as denoted by reference numbers 332 and 133. The control device 200 also may transmit a signal to the controllee 122 via at least one AP 120 as denoted by reference numbers 332 and 134 and, in this case, the control device 200 requests to the server 150 for controlling the second controllee 122 such that the server 150 transmits the signal to the second controllee 122 via the second AP 120.

Figure 2:
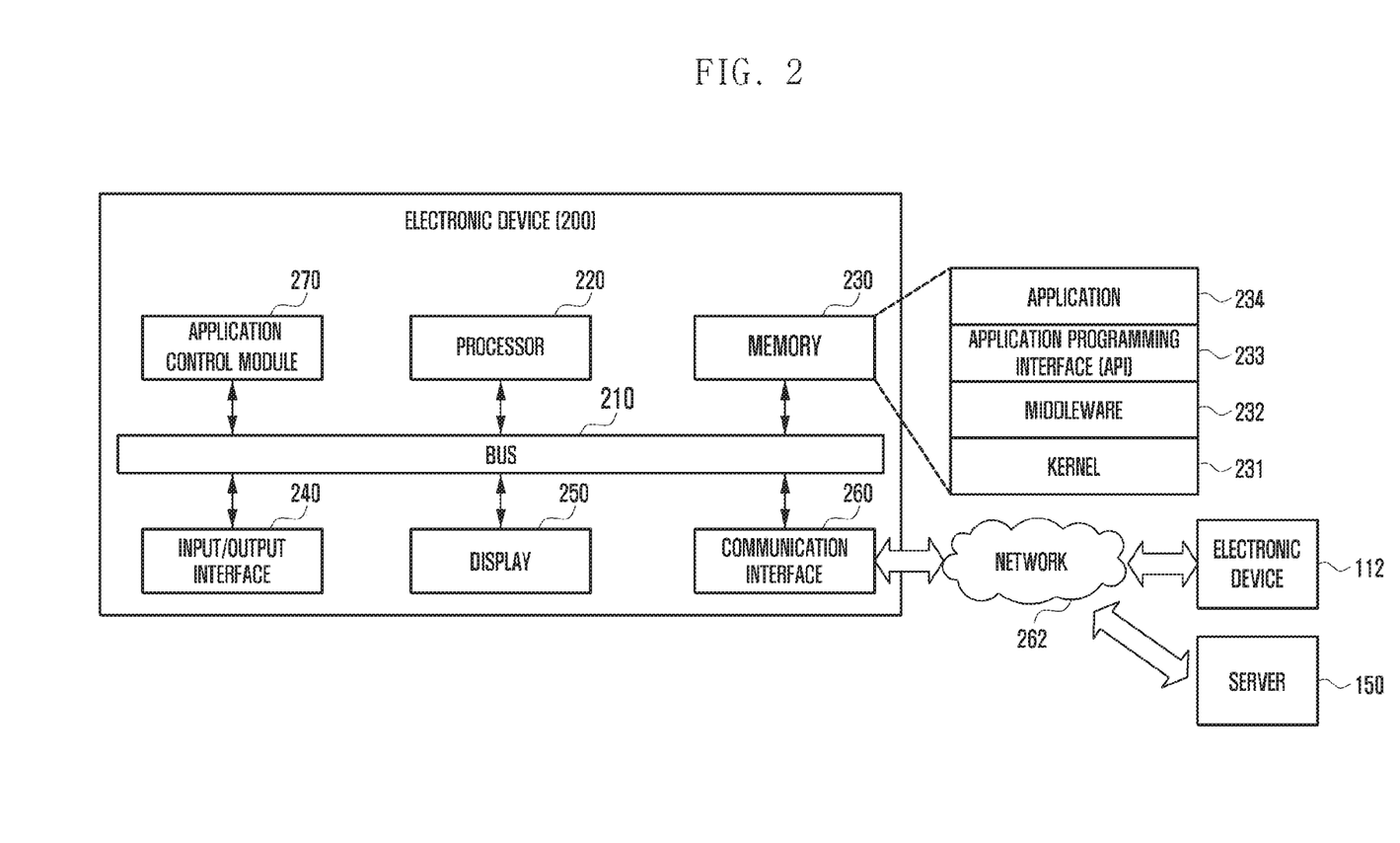
FIG. 2 is a diagram illustrating the network environment including the control device to which the present invention is applied.

FIG. 2 is a diagram illustrating the network architecture including the control device according to an embodiment of the present invention.

Referring to FIG. 2, the control device 200 includes a bus 210, a processor 220, a memory 230, an input/output interface 240, a display 250, a communication interface 260, and an application control module 270.

The bus 210 may be a circuitry which connects the aforementioned components to each other to communicate signals (e.g. control messages) therebetween.

The processor 220 receives a command from any of the aforementioned components (e.g. memory 230, input/output interface 240, display 250, communication interface 260, and application control module) through the bus 210, interprets the command, and executes operation or data processing according to the decrypted command.

The memory 230 may store the command or data received from the processor 220 or other components (e.g. input/output interface 240, display 250, communication interface 260, application control module, etc.) or generated by the processor 220 or other components. The memory 230 may store program modules including kernel 231, middleware 232, Application Programming Interface (API) 233, and applications 234. Each programming module may be implemented as software, firmware, hardware, and any combination thereof. The memory may also have a region for storing the information on whether each controllee can be controlled directly or via a specific AP according to an embodiment of the present invention.

The kernel 231 may control or manage the system resources (e.g. bus 210, processor 220, and memory 230) for use in executing the operation or function implemented with the middleware 232, the API 233, or the application 234. The kernel 231 also may provide an interface allowing the middleware 232, API 233, or application 234 to access the components of the control device 200 for control or management thereof.

The middleware 232 may work as a relay of data communication between the API 233 or application 234 and the kernel 231. The middle 232 may execute control of the task requests (e.g. scheduling and load balancing requests) from the applications 234 in such a way of assigning priority for use of the system resource (e.g. bus 210, processor 220, and memory 230) of the electronic device to at least one of the applications 234.

The API 233 is the interface for the applications 234 to control the function provided by the kernel 231 or the middleware 232 and may include at least one interface or function (e.g. command) for file control, window control, image control, or text control.

The applications 234 may include Short Messaging Service/Multimedia Messaging Service (SMS/MMS) application, email application, calendar application, alarm application, health care application (e.g. application of measuring quantity of motion or blood sugar level), and environmental information application (e.g. atmospheric pressure, humidity, and temperature applications). The application 234 may also be an application related to information exchange between the control device 200 and other external electronic device (e.g. controllees 112 and 122). The applications 234 may include an application for controlling the controllees and an application communicating with the server 150 that are installed separately or collectively. Examples of the information exchange application may include a notification relay application for relaying specific information to the external electronic device and a device management application for managing the external electronic device.

For example, the notification relay application may be provided with a function of relaying the alarm information generated by the other applications (e.g. SMS/MMS application, email application, health care application, and environmental information application) of the electronic device to an external electronic device (e.g. controllees 112 and 122 and other types of electronic devices). The notification relay application may also provide the user with the notification information received from an external electronic device (e.g. controllees 112 and 122 and other types of electronic devices). The electronic device application may manage (e.g. install, delete, and update) the function of an external electronic device (e.g. turn-on/off of controllees 112 and 122 and other types of electronic devices (or part of them) or adjustment of the brightness (or resolution) of the display) which communicates with the control device 200 or the service (e.g. communication or messaging service) provided by the external electronic device or an application running on the external device.

The applications 234 may include an application designated according to the property (e.g. type) of an external electronic device (e.g. controllees 112 and 122 and other types of electronic devices). If the external electronic device is the MP3 player, the applications 234 may include a music playback application. Similarly, if the external electronic device is a mobile medical appliance, the applications 234 may include a health care application. If the external electronic device is the heating control system, the applications 234 may include a heating control application.

The applications 234 may include an application designated to the control device or at least one of the applications received from external electronic devices (e.g., the server 150, controllees 112 and 122, and other types of electronic devices).

The input/output interface 240 delivers the command or data input by the user through an input/output device (e.g. sensor, keyboard, and touchscreen) to the processor 220, memory 230, communication interface 260, and/or application control module through the bus 210. For example, the input/output interface 240 may provide the processor 220 with the data corresponding to the touch made by the user on the touchscreen. The input/output interface 240 may output the command or data (which is received from the processor 220, memory 230, communication interfaced 260, or the application control module through the bus 210) through the input/output device (e.g. speaker and display). For example, the input/out interface 240 may output the voice data processed by the processor 220 to the user through the speaker. The voice data is output through the speaker in the form of audible sound wave.

The display 250 may present various information (e.g. multimedia data and text data) to the user.

The communication interface 260 may establish a communication connection of the control device 200 with an external device (e.g. controllees 112 and 122 and other types of electronic devices and server 150). For example, the communication interface 260 connects to the network 262 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

The network 262 may be a telecommunication network. The communication network may include at least one of computer network, Internet, Internet of Things, and telephone network. According to an embodiment, the communication protocol between the control device 200 and an external device (e.g. transport layer protocol, data link layer protocol, and physical layer protocol) may be supported by at least one of the applications 234, API 233, middleware 232, kernel 231, and communication interface 260.

The application control module 270 may process at least part of the information acquired from other components (e.g. the processor 220, memory 230, input/output interface 240, and communication interface 260) and provide the processing result to the user. For example, the application control module 270 may check the information on the device connected to the control device 200, store the information on the connected device in the memory 230, and execute the application 234 based on the information of the connected device.

In the above description, the processor 220 and the application control module 270 are described separately. However, the application control module 270 may be integrated into the processor 220, and the processor 220 and application control module 270 may be referred to collectively as "control unit".

According to an embodiment of the present invention, the above described control device of FIG. 2 and controllees may be various types of electronic devices equipped with a communication function. Examples of the electronic device include a smartphone, a table Personal Computer (PC), a mobile phone, a video phone, an electronic book (ebook) reader, a desktop PC, a laptop computer, a netbook computer, a Personal Digital Assistant (PDA), a Portable Multimedia Player (PMP), an MP3 player, a mobile medical appliance, a camera, a wearable device (e.g. electronic glasses and Head Mounted Device (HMD)), an electronic cloth, an electronic bracelet, an electronic necklace, an electronic appcessory, an electronic tattoo, and a smartwatch.

Also, the electronic devices of FIG. 2 including the control device and controllees that are described in the present invention may be various types of smart home appliances equipped with a communication function. Examples of the smart home appliance include a Television, a Digital Video Disk (DVD) player, an audio, a refrigerator, an air conditioner, a vacuum cleaner, an oven, a microwave oven, a laundry machine, an air cleaner, a set-top box, a TV box (e.g. Samsung HomeSync™, Apple TV™, and Google TV™), a game console, an electronic dictionary, an electronic key, a camcorder, and an electronic frame.

Furthermore, the electronic devices of FIG. 2 including the control device and controllees may be electronic devices including at least one of a medical device (e.g. devices for Magnetic Resonance Angiography (MRA), Magnetic Resonance Imaging (MRI)), and Computed Tomography (CT), a moving-camera, an ultrasonic device), a Navigation device, a Global Positioning System (GPS) receiver, an Event Data Recorder (EDR), a Flight Data Recorder (FDR), a car infotainment device, electronic equipment for ship (e.g. maritime navigation device and gyro compass), aviation electronic device (avionics), security device, a vehicle head unit, an industrial or home robot, an Automatic Teller Machine (ATM) of a financial institution, and a Point Of Sales (POS).

According to an embodiment, the above described control device of FIG. 2 and controllees may be various types of electronic materials including furniture or part of building/construction which has a communication function, an electronic board, an electronic signature receiving device, a projector, and a metering device (e.g. water, electricity, and electric wave metering devices). According to an embodiment, the electronic device may be one or any combination of the above enumerated devices. According to an embodiment, the electronic device may be a flexible device. However, it is obvious to those in the art that the electronic device of the present invention is not limited to the above devices.

Figure 3:
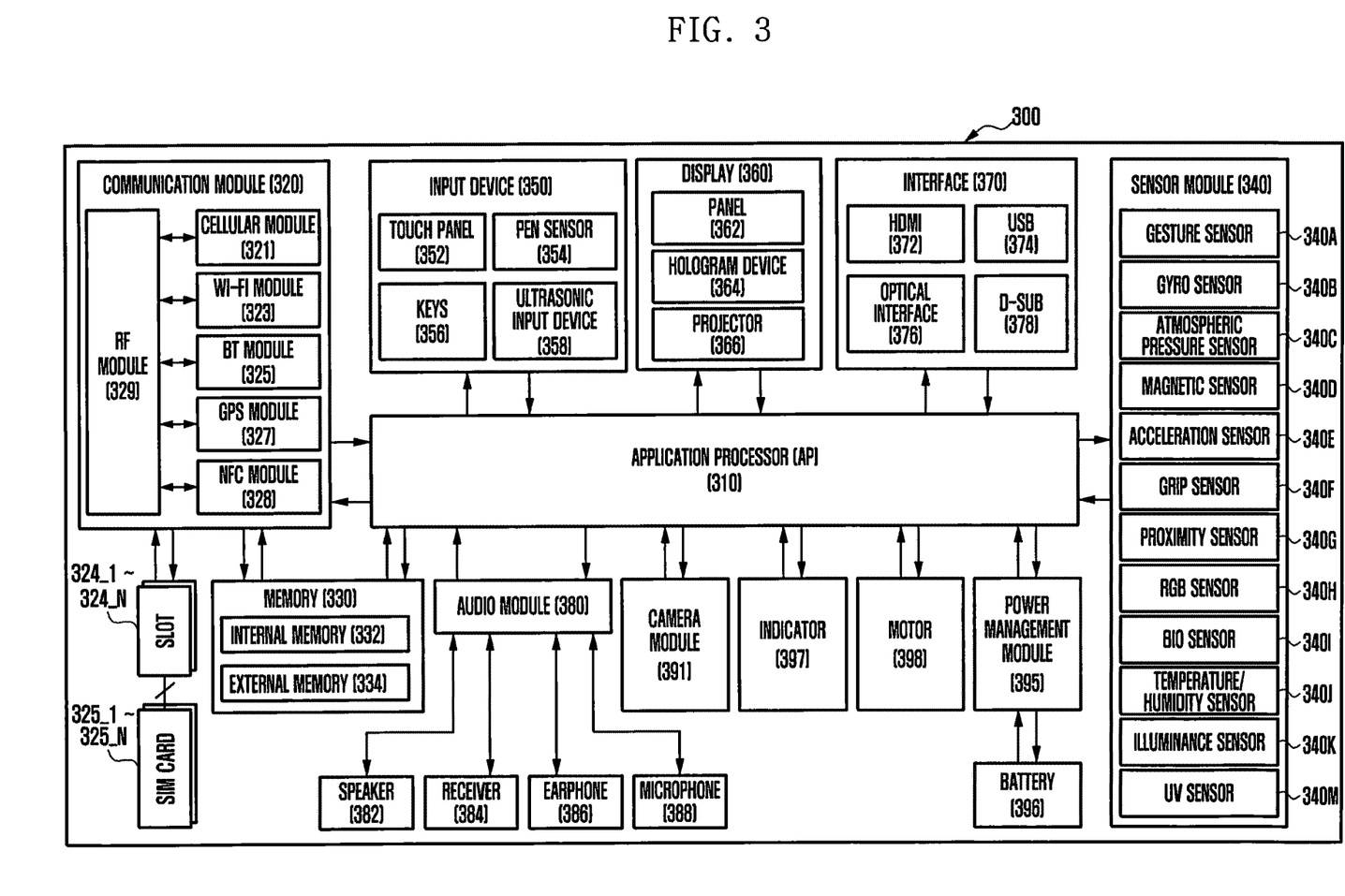
FIG. 3 is a block diagram illustrating a configuration of a mobile communication terminal as the electronic device for performing the control function according to the present invention.

FIG. 3 is a block diagram illustrating a configuration of a mobile communication terminal as the electronic device for performing the control function according to the present invention.

The electronic device 300 of FIG. 3 may be of the whole or part of the control device 200 depicted in FIG. 2. The electronic device 301 may include an Application Processor (AP) 310, a communication module 320, slots 324_1 to 324_N to receive Subscriber Identity Module (SIM) cards 325_1 to 325_N, a memory 330, a sensor module 340, an input device 350, a display 360, an interface 370, an audio module 380, a camera module 391, a power management module 395, a battery 396, an indicator 397, and a motor 398.

The AP 310 may operate an Operating System (OS) and/or application programs to control a plurality of hardware and/or software components connected to the AP 310 and perform data-processing and operations on multimedia data. For example, the AP 310 may be implemented in the form of System on Chip (SoC). According to an embodiment, the AP 310 may include a Graphic Processing Unit (GPU) (not shown).

The communication module 320 (e.g. communication interface 260) may perform data communication with other electronic devices (e.g. controllees 112 and 122 and other types of electronic devices and server 150) through a network. According to an embodiment, the communication module 320 may include a cellular module 321, a Wi-Fi module 323, a BT module 325, a GPS module 327, an NFC module 328, and a Radio Frequency (RF) module 329.

The cellular module 321 is responsible for voice and video communication, text messaging, and Internet access services through a communication network (e.g. LTE, LTE-A, CDMA, WCDMA, UMTS, WiBro, and GSM networks). The cellular module 321 may perform identification and authentication of electronic devices in the communication network using the SIM card 324. According to an embodiment, the cellular module 321 may perform at least one of the functions of the AP 310. For example, the cellular module 321 may perform at least a part of the multimedia control function.

The cellular module 321 may also include a Communication Processor (CP). The cellular module 321 may be implemented in the form of SOC. Although the cellular module 321 (e.g. communication processor), the memory 330, and the power management module 395 are depicted as independent components separated from the AP 310 in FIG. 3, the present invention is not limited thereto but may be embodied in a way that the AP includes at least one of the components (e.g. cellular module 321).

Each of the AP 310 and the cellular module 321 (e.g. communication processor) may load a command or data received from at least one of the components on a non-volatile or volatile memory and process the command or data. The AP 310 or the cellular module 321 may store the data received from other components or generated by at least one of other components in the non-volatile memory.

Each of the Wi-Fi module 323, the BT module 325, the GPS module 327, and the NFC module 328 may include a processor for processing the data it transmits/receives. Although the cellular module 321, the Wi-Fi module 323, the BT module 325, the GPS module 327, and the NFC module 328 are depicted as independent blocks in FIG. 3; at least part (e.g., two) of the cellular module 321, the Wi-Fi module 323, the BT module 325, the GPS module 327, and the NFC module 328 may be embedded in an integrated chip (IC) or an IC package). For example, at least part of the processors corresponding to the cellular module 321, the Wi-Fi module 323, the BT module 325, the GPS module 327, and the NFC module 328 (e.g. communication processor corresponding to the cellular module 321 and Wi-Fi processor corresponding to the Wi-Fi module 323) may be implemented in the form of a SoC.

The RF module 329 is responsible for data communication, e.g. transmitting/receiving RF signals. Although not depicted, the RF module 329 may include a transceiver, a Power Amp Module (PAM), a frequency filter, and a Low Noise Amplifier (LNA). The RF module 329 also may include the elements for transmitting/receiving electric wave in free space, e.g. conductor or conductive wire. Although FIG. 3 is directed to the case where the Wi-Fi module 323, the BT module 325, the GPS module 327, and the NFC module 328 are sharing the RF module 329, the present invention is not limited thereto but may be embodied in a way that at least one of the Wi-Fi module 323, the BT module 325, the GPS module 327, and the NFC module 328 transmits/receives RF signals through an independent RF module.

The SIM cards 325_1 to 325_N may be designed so as to be inserted into slots 324_1 to 324_N formed at a predetermined position of the electronic device. The SIM cards 325_1 to 325_N may store unique identity information (e.g. Integrated Circuit Card Identifier (ICCID)) or subscriber information (e.g. International Mobile Subscriber Identity (IMSI)).

The memory 330 (e.g. memory 130) may include at least one of the internal memory 332 and an external memory 334. The internal memory 332 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory). The internal memory 332 may be a Solid State Drive (SSD). The external memory 334 may be a flash drive such as Compact Flash (CF), Secure Digital (SD), Micro-SD, Mini-SD, extreme Digital (xD), and Memory Stick. The external memory 334 may be connected functionally to the control device 200 through various interfaces. According to an embodiment, the control device 200 may include a storage device (or storage medium) such as a hard drive.

The sensor module 340 may measure physical quantity or check the operation status of the control device 200 and convert the measured or checked information to an electric signal. The sensor module 340 may include at least one of gesture sensor 340A, gyro sensor 340B, barometric sensor 340C, magnetic sensor 340D, acceleration sensor 340E, grip sensor 340F, proximity sensor 340G, color sensor 340H (e.g. red, green, blue (RGB) sensor), bio sensor 340I, temperature/humidity sensor 340J, illuminance sensor 340K, and ultra violet (UV) sensor 340M. Additionally or alternatively, the sensor module 340 may include E-nose sensor (not shown), electromyography (EMG) sensor (not shown), electroencephalogram (EEG) sensor (not shown), electrocardiogram (ECG) sensor (not shown), infrared (IR) sensor (not shown), iris sensor (not shown), and fingerprint sensor (not shown). The sensor module 340 may further include a control circuit for controlling at least one of the sensors included therein.

The input device 350 may include a touch panel 352, a (digital) pen sensor 354, keys 356, and an ultrasonic input device 358. The touch panel 352 may be one of capacitive, resistive, infrared, and microwave type touch panel. The touch panel 352 may include a control circuit. In the case of the capacitive type touch panel, it is possible to detect physical contact or approximation. The touch panel 352 may further include a tactile layer. In this case, the touch panel 352 may provide the user with haptic reaction.

The (digital) pen sensor 354 may be implemented with a sheet with the same or similar way as touch input of the user or as a separate recognition sheet. The keys 356 may include physical buttons, optical key, and keypad. The ultrasonic input device 358 is a device capable of checking data by detecting sound wave through a microphone 388 and may be implemented for wireless recognition. According to an embodiment, the control device 200 may receive the user input made by means of an external device (e.g. computer or server) connected through the communication module 320.

The display 360 (e.g. display module 250) may include a panel 362, a hologram device 364, and a projector 366. The panel 362 may be a Liquid Crystal Display (LCD) panel or an Active Matrix Organic Light Emitting Diodes (AMOLED) panel. The panel 362 may be implemented so as to be flexible, transparent, and/or wearable. The panel 362 may be implemented as a module integrated with the touch panel 352. The hologram device 364 may present a 3-dimensional image in the air using interference of light. The projector 366 may project an image to a screen. The screen may be placed inside or outside the electronic device. According to an embodiment, the display 360 may include a control circuit for controlling the panel 362, the hologram device 364, and the projector 366.

The interface 370 may include a High-Definition Multimedia Interface (HDMI) 372, a Universal Serial Bus (USB) 374, an optical interface 376, and a D0subminiature (D-sub) 378. The interface 370 may include the communication interface 160 as shown in FIG. 2. Additionally or alternatively, the interface 370 may include a Mobile High-definition Link (MHL) interface, an SD/MMC card interface, and an infrared Data Association (irDA) standard interface.

The audio module 380 may convert sound to electric signal and vice versa. At least a part of the audio module 380 may be included in the input/output interface 140 as shown in FIG. 2. The audio module 380 may process the audio information input or output through the speaker 382, the receiver 384, the earphone 386, and the microphone 388.

The camera module 391 is a device capable of taking still and motion pictures and, according to an embodiment, includes at least one image sensor (e.g. front and rear sensors), a lens (not shown), an Image Signal Processor (ISP) (not shown), and a flash (e.g. LED or xenon lamp) (not shown).

The power management module 395 may manage the power of the control device 200. Although not shown, the power management module 395 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology include resonance wireless charging and electromagnetic wave wireless charging, and there is a need of extra circuit for wireless charging such as coil loop, resonance circuit, and diode.

The battery gauge may measure the residual power of the battery 396, charging voltage, current, and temperature. The battery 396 may store or generate power and supply the stored or generated power to the control device 200. The battery 396 may include a rechargeable battery or a solar battery.

The indicator 397 may display operation status of the control device 200 or a part of the electronic device, booting status, messaging status, and charging status. The motor 398 may convert the electronic signal to mechanical vibration. Although not shown, the control device 200 may include a processing unit (e.g. GPU) for supporting mobile TV. The processing unit for supporting the mobile TV may be able to process media data abiding by broadcast standards such Digital Multimedia Broadcasting (DMB), Digital Video Broadcasting (DVB), and media flow.

The above enumerated components of the electronic device of the present invention may be implemented into one or more parts, and the names of the corresponding components may be changed depending on the kind of the electronic device. The electronic device of the present invention may include at least one of the aforementioned components with omission or addition of some components. The components of the electronic device of the present invention may be combined selectively into an entity to perform the functions of the components equally as before the combination.

The term "module" according to the embodiments of the invention means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

Figure 4:
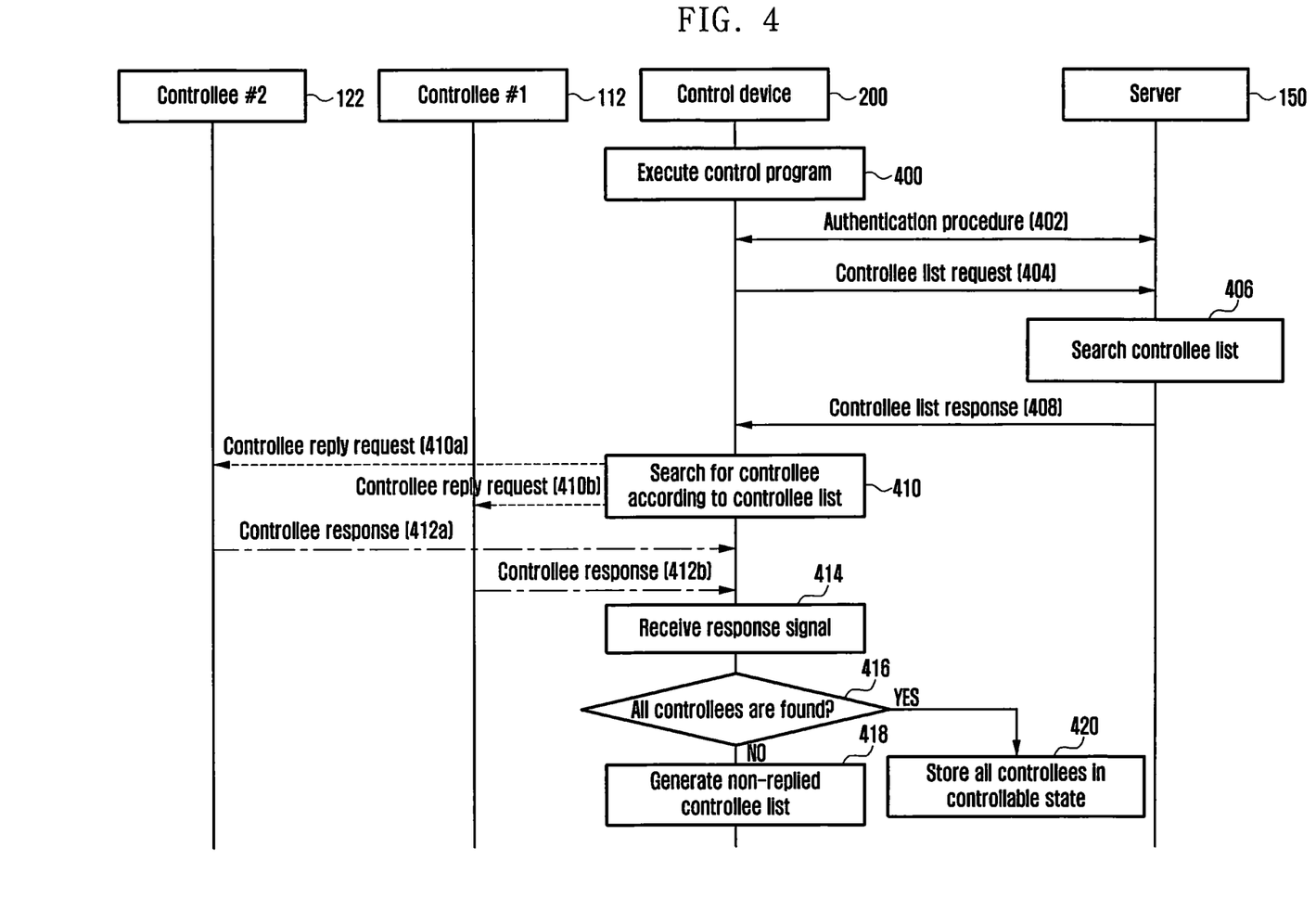
FIG. 4 is a signal flow diagram illustrating a procedure for a control device to discover controllees according to the present invention

FIG. 4 is a signal flow diagram illustrating a procedure for a control device to discover controllees according to the present invention. If it is necessary, the components of the control device of FIG. 2 may be mentioned to explain the procedure of FIG. 4. However, it is obvious to those skilled in the art that the configuration of FIG. 3 can be applied in the same manner.

Referring to FIG. 4, the control device 200 executes a control program at step 400. Here, the control program may be a program for controlling the controllees 112 and 122 directly or via the AP(s) and/or the server. The control program may be downloaded from the server 150 or pre-installed in the control device 200. Controlling a controllee may mean a control operation for turn-on/off or scheduled turn-on/off of a television or a control operation for scheduled laundry or dry. Controlling a controllee may mean a control operation for turn-on/off of a robot cleaner and for scheduled recording of a video device. Various types of electronic devices deployed in a house can be the objects to be controlled.

Thus the control program may have the information on the operations that can be configured to the respective controllees.

If the control program is executed, the control device 200 connects to the server 150 through an AP or a mobile communication network to perform an authentication procedure on the control device 200 and the version information of the control program. This authentication procedure may be performed in the same way as or a similar way to a normal authentication procedure for a certain program to download data from the server. Since the electronic device and control program authentication procedure is out of the scope of the present invention, detailed description thereon is omitted herein.

Next, the control device 200 requests to the server 150 for a list of the controllees registered with the server 150 at step 404. As described above, the server 150 may have the information on the control device and controllees which can be controlled by the control device per smart home and the information on the APs which are capable of communicating with the controllees and/or control device. Table 1 shows an exemplary database table for managing the information on the control device and controllees which can be controlled by the control device per smart home and the information on the APs which are capable of communicating with the controllees and/or control device.

TABLE 1

| Home name | Control device ID | Controllee ID | Available AP address | ... |
|---|---|---|---|---|
| Cheolsu's home | xxxxxxx | xyzxyz xyzabc 123abc | 201.01.113.4 201.101.113.1 | ... |
| . | . | . | . | |
| Younghi's home | aaaaaa | Abcdef Cdcdef | 88.221.10.1 | ... |
| . | . | . | . | |
| . | . | . | . | ... |
| . | . | . | . | |

Table 1 stores the control device ID, the controllee ID, and available AP address. In Table 1, the home name may be the real name of a subscriber or an ID registered with the server. The control device ID may be a phone number of a mobile communication terminal capable of cellular communication. The controllee ID may be a unique product number or an MAC address of a controllee.

Although Table 1 is drawn as an example to help understand the present invention, the database of the server 150 may store more diverse information.

If the controllee list request is received from the control device 200 at step 404, the server retrieves the information, e.g. identifiers, of the controllees corresponding to the control device from its database at step 406. Next, the server 150 generates the retrieved controllees information in the form of a list and sends the information to the control device 200 at step 408. At this time, the server 150 may transmit the corresponding information through a network requested by the control device 200. For example, if the control device 200 has transmitted the controllee list request signal through the mobile communication network, the response may be transmitted through the mobile communication network at step 408. Alternatively, if the control device 200 transmits the controllee list request signal to the server 150 via an AP, the response may be transmitted through the AP at step 408.

If the controllee list response is received from the server 150 at step 408, the control device 200 may store the controllee information in the memory 330.

Next, the control device 200 searches for the controllees included in the controllee list received from the server 150. The controllee search may be performed per controllee or may transmit a signal requesting for reply from all controllees. FIG. 4 is directed to an exemplary case where the control device 200 transmits the controllee reply request signal to respective controllees as denoted by reference numbers 410a and 410b.

At this time, the control device 200 may communicate with the controllees directly or may transmit the reply request signal to the controllees via an AP located nearby as described with reference to FIG. 1. Although FIG. 4 is directed to the case where the signals are transmitted to the controllees 112 and 122 directly, it may be possible that the signals are transmitted to the controllees 112 and 122 via an AP. It is also possible to transmit a reply request signal to all of the controllees. In this case, the controllees 112 and 122 may make a channel sensing to generate a reply signal when no other controllee transmits a reply signal or may generate a random value to wait for expiry of the backoff time corresponding to the random value.

In the following description, it is assumed that the control device 200 transmits the reply request signal to the respective controllees 112 and 122 separately.

Accordingly, the control device 200 may receive the reply signals from the controllees 112 and 122 at steps 412a and 412b. In the case that the second controllee 122 is connected to a different AP or located in an area difficult to receive the signal from the control device 200 as shown in FIG. 1, however the second controllee 122 cannot receive the controllee reply request signal and consequently cannot transmit the reply signal at step 412a.

As described above, the control device 200 may receive the reply signal in response to the reply request signal at step 414 and determine whether all controllees are discovered at step 416. If no reply is received from a certain controllee, the control device 200 may mark the controllee as uncontrollable in the list that has been received at step 408, the list being stored in the memory 230. That is, the control device 200 generates a non-replied controllee list at step 418. This list is generated to control the non-replied controllee via the server. For example, if the list received at step 408 includes the first and second controllees 112 and 122 and if no reply is received from the second controllee 122, the control device 200 determines to control the second controllee via the server 150. The list including the controllees to be controlled via the server 150 is referred to as "non-replied controllee list" hereinafter.

If the control device 200 receives the reply signals from all of the controllees, it determines that all of the controllees are in the controllable state at step 420.

The operations of steps 410 to 418 or to 420 may be performed in unit of predetermined time in response to a control request of the user for controlling the controllees. Suppose that the first controllee 112 exemplified in FIG. 1 is a robot cleaner. The robot cleaner which is located in the communication area 111 of the first AP 110 may complete cleaning and then move to the coverage area of the second AP 120. This may be the case where the control device 200 which is controlling the controllee via the first AP 110 loses the control to the controllee via the first AP 110. This may also be the case where a person or an object that did not exist around the APs 110 and 120 during the operation of step 410 is located there so as to change the radio channel environment and coverage area of a specific AP.

Since various changes may occur, it is preferred to perform the operation subsequent to step 410 in unit of predetermined time or in response to the user's request for controlling the controllees 112 and 122 that is made by means of the control device 200.

The above description has been directed to the case where the control device 200 acquires a list of the controllees 112 and 122 and makes direct communications with the controllees 112 and 122 discovered based on the list (in the coverage area of the same AP in controlling via the AP) and the case where the control device generates a list of controllees with which no direct communication is possible (out of the coverage area of the same AP in controlling via the AP). A description is made of the operation for the control device 200 controls the controllees 112 and 122 using the acquired information hereinafter.

Figure 5A:
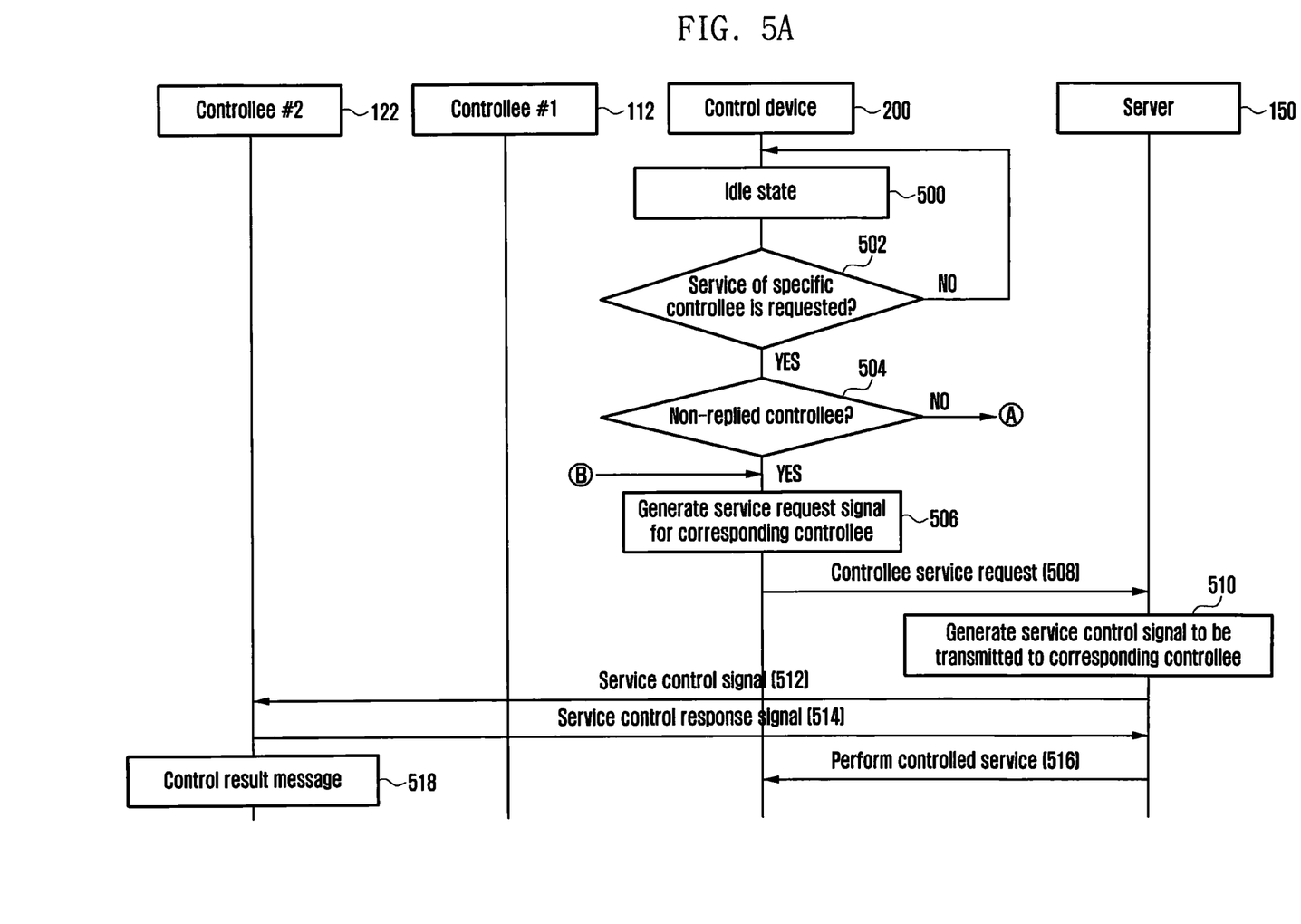
FIG. 5a is a signal flow diagram for the case where the control device cannot control the controllee directly or via an AP.
Figure 5B:
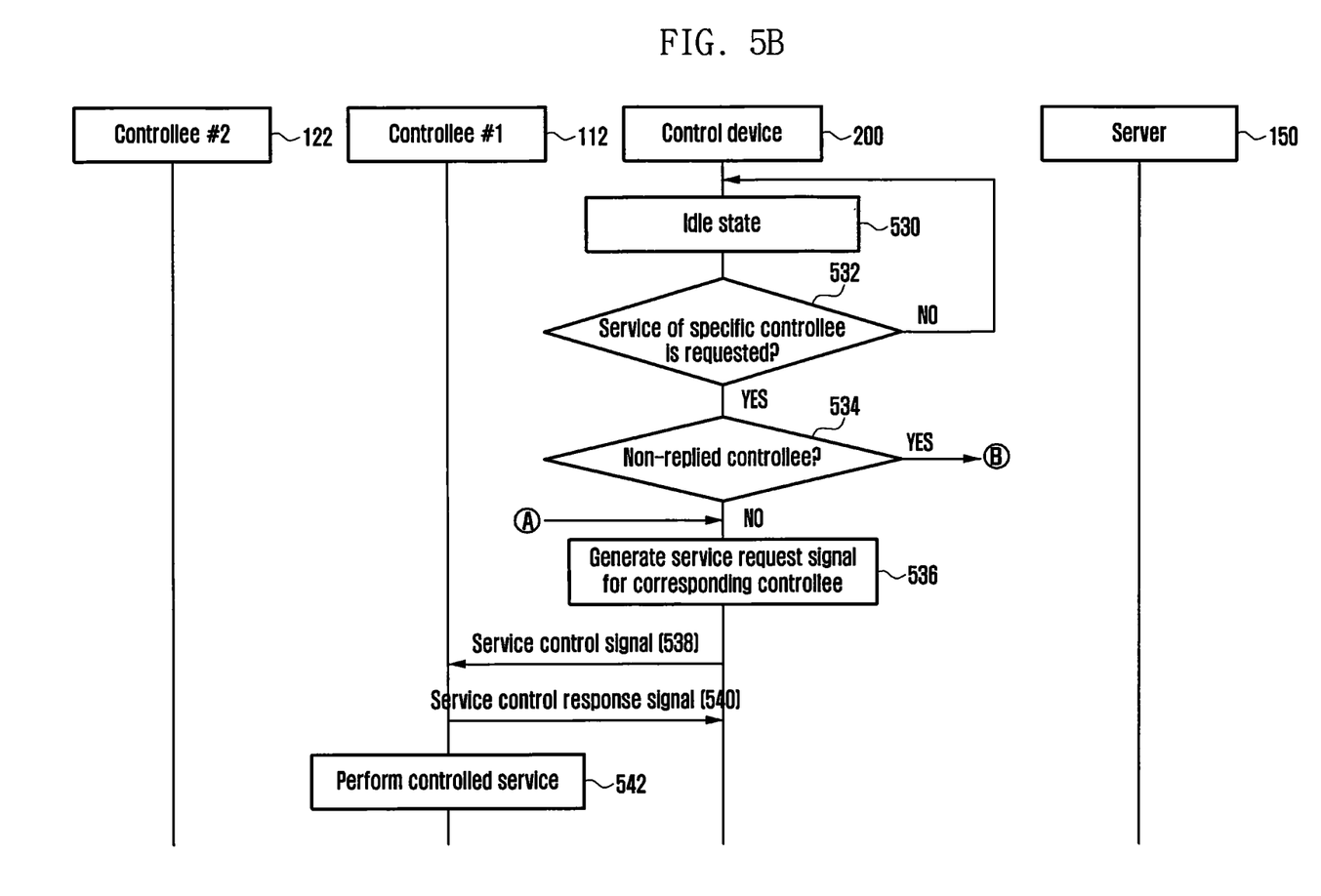
FIG. 5b is a signal flow diagram for the case where the control device can control the controllees directly or via an AP.

FIGS. 5a and 5b are signal flow diagrams illustrating procedures for a control device to control controllees according to the present invention. FIG. 5a is a signal flow diagram for the case where the control device cannot control the controllee directly or via an AP, and FIG. 5b is a signal flow diagram for the case where the control device can control the controllee directly or via an AP.

Referring to FIG. 5a, the control device 200 stays in an idle state at step 500. Here, the idle state may be a state of waiting for receiving a specific operation request, e.g. service request targeted to a specific electronic device. If the control device 200 is a cellular mobile communication terminal, the idle state may include a state of waiting for an incoming/outgoing call event, incoming/outgoing text message event, application execution alarm, or receiving a push message from a specific application or a specific server.

The control device 200 may determine whether a service request of a specific electronic device is received at step 502. Here, the service request of the specific electronic device may be a request for controlling a controllee. If the user makes a request for a service to control a specific electronic device through the input/output interface 240, the processor 220 and/or the application control module 270 may execute a corresponding control program or call a program residing on the memory.

Next, the control device 200 determines whether the electronic device targeted for the service is a non-replied device based on the information stored in the memory 330 at step 504. If it is determined that the electronic device is a non-replied electronic device, the procedure goes to step 506 or otherwise to step 536 of FIG. 5b.

If it is determined that the service-requested electronic device is a non-replied electronic device at step 504 and thus the procedure goes to step 506, the control device 200 generates a service request signal for the service-requested controllee. As described above, the service request which the user may make is limited depending on the type of the controllee. Accordingly, the control device 200 generates a signal corresponding to the service which is requested by the user and which the corresponding electronic device, i.e. the controllee, has to perform. Accordingly, the service request signal generated at step 506 may include the identifier of the controllee and the information on the requested operation.

Afterward, the control device 200 transmits the service request signal for the controllee to the server 150 at step 508. For example, the processor 220 controls the communication interface 260 to transmit the service request signal to the server 150 through the network 262. At this time, if the control device 200 is an electronic device capable of using a cellular mobile communication network, the network 262 may be the cellular mobile communication network; if the control device is an electronic device capable of using only AP for communication, the communication interface 260 may transmit the signal to the AP.

If the service request signal is for a predetermined controllee at step 508, the server 150 may generate the service control signal to be transmitted to the corresponding controllee at step 510. The signal flow diagram of FIG. 5a is depicted under the assumption that a request for controlling the second controllee 122 is generated as shown in FIG. 1.

Accordingly, the server 150 transmits the service control signal generated at step 510 to the second controllee 122 at step 512. At this time, the server 150 may transmit the service control signal generated at step 510 to all of the APs to which the second controllee may connect and, if it is possible to check the AP to which the second controllee has connected in advance, the server 150 may transmit the service control signal generated at step 510 to the corresponding AP.

If the service control signal is received, the second controllee 122 sends the server 150 a service control response signal through the corresponding AP at step 514. The second controllee 122 may perform the controlled service at step 518. At this time, it should be noted that the order of steps 514 and 518 may be changed. For example, it may be possible to perform the controlled service and then transmit the service response signal including the result information at step 514.

If the service control response signal is received, the server may send the control device 200 a control result message at step 516 in response to the service control response signal. At this time, the server 150 may transmit the control result message to the control device 200 through the network which the control device 200 has used to transmit the service request message at step 508. If the order of steps 514 and 518 is changed, the controlled service execution result data may be included. If the user makes a request for controlling to turn on/off the security system, the turn-on/off operation control request may be transmitted to the security system through the above described operations. Accordingly, the second controllee 122 turns on/off the security system and then may provide the control device 200 with the turn-on/off operation result.

Although not shown in the drawing, the control device 200 may display the information on the control result which is received from the server 150 at step 516 on the display 250. In the case of displaying the control result on the display module 250, the control device 200 may display the information on whether the controllee is controlled successfully and the current state of the controllee based on the information received from the controllee via the server 150.

A description is made of the case where the control device controls the controllee directly or via an AP hereinafter with reference to FIG. 5b.

The control device 200 stays in the idle state at step 530. Here, the idle state may be a state of waiting for receiving a specific operation request, e.g. service request targeted to a specific electronic device. If the control device 200 is a cellular mobile communication terminal, the idle state may include a state of waiting for an incoming/outgoing call event, incoming/outgoing text message event, application execution alarm, or receiving a push message from a specific application or a specific server.

The control device 200 may determine whether a service request of a specific electronic device is received at step 532. Here, the service request of the specific electronic device may be a request for controlling a controllee. If the user makes a request for a service to control a specific electronic device through the input/output interface 240, the processor 220 and/or the application control module 270 may execute a corresponding control program or call a program residing on the memory.

Next, the control device 200 determines whether the electronic device targeted for the service is a non-replied device based on the information stored in the memory 330 at step 534. If it is determined that the electronic devices is a non-replied electronic device, the procedure goes to step 536 or otherwise to step 506 of FIG. 5a.

If it is determined that the service-requested electronic device is a non-replied electronic device at step 534 and thus the procedure goes to step 536, the control device 200 generates a service request signal for the service-requested controllee. As described above, the service request which the user may make is limited depending on the type of the controllee. Accordingly, the control device 200 generates a signal corresponding to the service which is requested by the user and which the corresponding electronic device, i.e. the controllee, has to perform. Accordingly, the service request signal generated at step 536 may include the identifier of the controllee and the information on the requested operation.

Afterward, the control device 200 may send the corresponding controllee a service control signal directly or via the AP to which the control device is connected at step 538. The signal flow diagram of FIG. 5b is depicted under the assumption of controlling the first controllee 112 as described with reference to FIG. 1.

If the service control signal is received, the first controllee 112 transmits a service control response signal to the control device 200 directly or via the AP to which the control device 200 is connected at step 540.

Although not depicted in the drawing, if the control response signal is received from the controllee at step 540, the control device 200 may display the control result information on the display 250. In the case of displaying the control result on the display module 250, the control device 200 may display the information on whether the controllee is controlled successfully and the current state of the controllee based on the information received from the controllee via the server 150.

The first control device 112 may also perform the controlled service at step 542. As described above, the order of steps 540 and 542 may be changed. For example, it may be possible to perform the controlled service at step 542 and then transmit the service response signal including the result information at step 540.

It should be understood that the above-described embodiments are essentially for illustrative purposes only and not in any way for restriction thereto. Thus the scope of the invention should be determined by the appended claims and their legal equivalents rather than the specification, and various alterations and modifications within the definition and scope of the claims are included in the claims.

INDUSTRIAL APPLICABILITY

The present invention is applicable to the case of controlling one or more controllees by means of a control device in a smart home system built on a wireless communication network.

The invention claimed is:

1. A method for a control device to discover and control controllees located on two or more networks in a smart home system, the method comprising:
   receiving a list of the controllees from a server by transmitting a request for the list of the controllees;
   transmitting a reply request signal to the controllees included in the list; and
   generating, when no response signal is received from at least one of the controllees, a non-replied controllee list for controlling the controllees from which no response signal is received via the server,
   wherein the non-replied controllee list includes controllees determined to not be controllable by the control device, and to be controlled by the server, when the non-replied controllee list is generated.

2. The method of claim 1, wherein the reply request signal comprises an identifier of the controllee and a reply request message.

3. The method of claim 1, wherein the response signal comprises an identifier of the controllee and a response message.

4. The method of claim 1, further comprising:
determining, when a request for controlling a controllee included in the list of the controllees is made, whether the controllee is present in the non-replied controllee list; and
controlling, when the controllee is present in the non-replied controllee list, the controllee via the server by transmitting a control request message.

5. The method of claim 4, further comprising receiving a control result message from the server.

6. The method of claim 5, further comprising displaying at least one of control result and state of the controllee which are acquired based on the control result message received from the server.

7. The method of claim 4, further comprising transmitting, when the controllee is absent in the non-replied controllee list, the control signal to the controllee.

8. The method of claim 7, further comprising receiving a control response signal from the controllee.

9. The method of claim 8, further comprising displaying at least one of control result and state of the controllee which are acquired based on the control result message received from the controllee.

10. The method of claim 1, wherein transmitting the reply request signal to the controllees comprises transmitting the reply request signal via an access point capable of communicating with the control device.

11. A control device for discovering and controlling controllees located on two or more networks in a smart home system, the control device comprising:
a communication interface for communicating data with the networks and data with a server;
a memory for storing a list of the controllees and a non-replied controllee list; and
a control unit which controls receiving the list of the controllees from a server and storing the list in the memory, transmitting a reply request signal to the controllees included in the list through the communication interface, and generating, when no response signal is received from at least one of the controllees, the non-replied controllee list for controlling the controllees from which no response signal is received via the server and storing the non-replied controllee list in the memory,
wherein the non-replied controllee list includes controllees determined to not be controllable by the control device, and to be controlled by the server, when the non-replied controllee list is generated.

12. The control device of claim 11, wherein the reply request signal comprises an identifier of the controllee and a reply request message.

13. The control device of claim 11, wherein the response signal comprises an identifier of the controllee and a response message.

14. The control device of claim 11, wherein the control unit determines, when a request for controlling a controllee included in the list of the controllees is made, whether the controllee is present in the non-replied controllee list and controls, when the controllee is present in the non-replied controllee list, the controllee via the server by transmitting a control request message.

15. The control device of claim 14, further comprising a display for displaying state information of the controllee,
wherein the control unit controls the display to display at least one of control result and state of the controllee which are acquired based on the control result message received from the server through the communication interface.

16. The control device of claim 14, wherein the control unit controls transmitting, when the controllee is absent in the non-replied controllee list, the control signal to the controllee through the communication interface.

17. The control device of claim 16, further comprising a display for displaying
state information of the controllee,
wherein the control unit controls displaying, when a control response signal is received from the controllee, at least one of the control result and state of the controllee which is acquired from the received control response signal.

18. The control device of claim 11, wherein the control unit controls transmitting the reply request signal by means of the communication interface via an access point capable of communicating with the control device.

* * * * *